R. H. D. MORRISON.
Seed-Drills.

No. 145,443.

Patented Dec. 9, 1873.

Attest
N. N. Norris
R. H. Whittlesey

Inventor
R. H. D. Morrison
Per James L. Norris
attorney.

UNITED STATES PATENT OFFICE.

ROBERT H. D. MORRISON, OF WINONA, MINNESOTA, ASSIGNOR OF ONE-HALF HIS RIGHT TO JESSIE TAISEY, OF SAME PLACE.

IMPROVEMENT IN SEED-DRILLS.

Specification forming part of Letters Patent No. 145,443, dated December 9, 1873; application filed May 7, 1873.

*To all whom it may concern:*

Be it known that I, ROBERT H. D. MORRISON, of Winona, in the county of Winona and State of Minnesota, have invented a certain new and useful Improvement in Seed-Drills, of which the following is a specification:

My invention relates to certain improvements in seed-drills and broadcast seeders; and consists of an improved feeding device to feed the seed from the hopper of the machine evenly, and without liability to clog and stop sowing, and also to increase the amount of seed sown, or diminish the same, as the case may be, at the will of the operator. My invention consists of an expanding and contracting feeding-cup, in which revolves a fluted feed-roller, which also expands and contracts endwise with the cup, and by this means will increase or diminish the amount of seed sown. The cup and feed-roller are operated by means of a lever.

Figure 1:
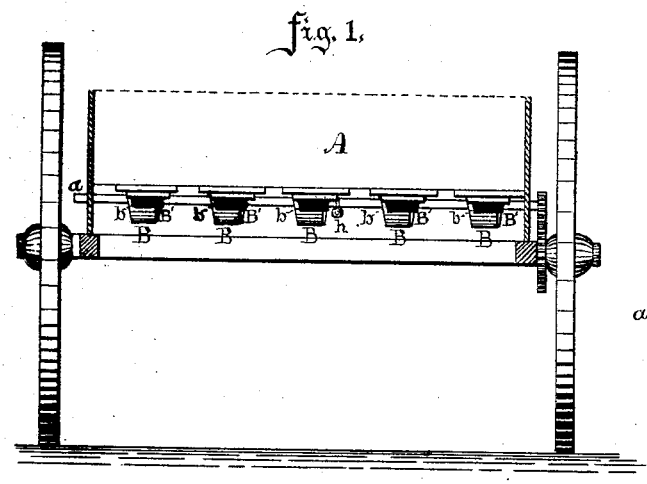
Figure 2:
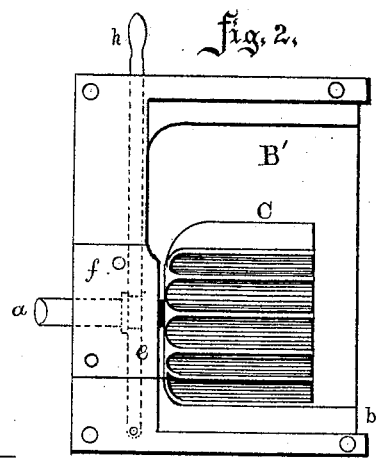
Figure 3:
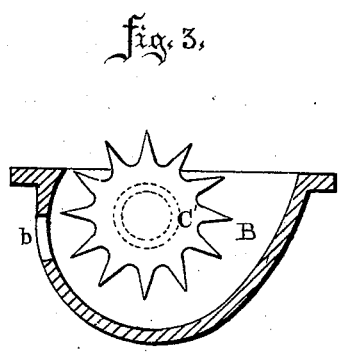
Figure 4:
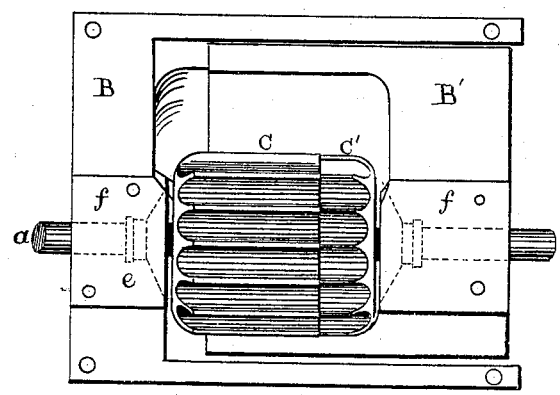

In the drawing, Figure 1 represents a rear view on a reduced scale, showing a series of the drills mounted on a shaft and carried by a vehicle. Fig. 2 is an enlarged top view of one portion of the cup, and also one portion of the hollow fluted feed-roller. Fig. 3 is an end view of the other portion of the cup and feed-roller, showing the shape of the flutes and the position of the roller. Fig. 4 is a top view of the whole feeding-cup, partly extended, showing, by dotted lines, the grooves into which the rims of the boxes engage to hold the feed-rollers in place in the cup.

A represents the hopper of the seeder. B' is the portion of the feed-cup which slips outside of the other part of the feed-cup B. C is the largest portion of the feed-roller, into which the smaller portion C' passes when the cup is slid together to make the flow of seed less. The feed-roller is caused to revolve in the cup B by means of the shaft *a*, which passes through both parts of the roller, and to which one portion of the roller is securely fastened. A movement of the shaft to the left, by means of the lever *h*, will cause one section of the cup and roller to expand and increase the capacity of the seed-cells, and an opposite movement will decrease their capacity; hence the expanding and contracting feeding-cup and expanding and contracting feed-roller.

The seed is placed in the feed-hopper A and the shaft *a* is set in motion by means of the wheel of the seeder; this revolves the feed-roller C in the cup B, and carries the seed down to the bottom of the cup, discharging it at the opening *b*. This opening, being arranged at a slant on its bottom edge, will cause the grain to commence to escape at its lower end and pass out evenly as the rib on the feed-roller C revolves; and as each rib is passing the upper part of the opening, the next rib will be in place to commence feeding out at the lower end, thus making an even and continuous feed.

I do not, broadly, claim a seed-dropper composed of two feed-rollers, sliding one within the other, for regulating the quantity of seed to be dropped, as such of itself is not new; but

Having thus described my invention, what I claim as new, and desire to secure by Letters Patent, is—

The stationary sectional cup B, provided with a fluted feed-roller, C, in combination with the sliding sectional cup B', having the fluted feed-roller C', and with the lever *h*, pivoted to the stationary cup B, for operating the sliding cup and feed-roller, all being constructed and arranged for operation substantially as specified.

In testimony that I claim the foregoing I have hereunto set my hand this 22d day of April, 1873.

ROBERT H. D. MORRISON.

Witnesses:
R. R. BRIGGS,
THOS. LIMPON.